United States Patent [19]

Gardziella et al.

[11] Patent Number: 4,918,116

[45] Date of Patent: Apr. 17, 1990

[54] HIGH TEMPERATURE RESISTANT MOLDING MATERIALS

[75] Inventors: Arno Gardziella, Witten-Rudinghausen; Karl-Heinz Schwieger, Iserlohn; Peter Adolphs, Menden-Halingen; Josef Suren, Wunnenberg-Haaren, all of Fed. Rep. of Germany

[73] Assignee: Rutgerswerke AG, Fed. Rep. of Germany

[21] Appl. No.: 312,884

[22] Filed: Feb. 17, 1989

Related U.S. Application Data

[63] Continuation-in-part of Ser. No. 054,605, May 27, 1987, abandoned.

[30] Foreign Application Priority Data

Jun. 13, 1986 [DE] Fed. Rep. of Germany ....... 3619541
Feb. 20, 1987 [DE] Fed. Rep. of Germany ....... 3705540

[51] Int. Cl.$^4$ .......................... C08J 5/14; C08L 61/00
[52] U.S. Cl. ..................... 523/149; 501/94; 501/95; 501/101; 501/102; 523/153; 523/157; 523/158; 524/541; 524/594; 525/480; 525/504; 260/998.13
[58] Field of Search ............... 523/149, 157, 153, 158; 524/594, 541; 525/504, 480; 260/998.13

[56] References Cited

U.S. PATENT DOCUMENTS 4,101,500 7/1978 Brodsky ........................ 528/163 X

FOREIGN PATENT DOCUMENTS 0118074 7/1982 Japan .

*Primary Examiner*—Theodore E. Pertilla
*Attorney, Agent, or Firm*—Bierman and Muserlian

[57] ABSTRACT

Improved high temperature resistant molding materials containing customary filler materials and additives and a carbon forming bonding agent which is a phenol novolac with a molar ratio of phenol to formaldehyde of 1 to 0.2 to 1 to 0.35 of high quality and free of solvents useful as refractory products, carbon materials, abrasive wheels, friction lining and the like.

9 Claims, No Drawings

HIGH TEMPERATURE RESISTANT MOLDING MATERIALS

PRIOR APPLICATION

This application is a continuation-in-part of U.S. patent application Ser. No. 054,605 filed May 27, 1987, now abandoned.

STATE OF THE ART

Refractory products can be differentiated according to their chemical composition, their shape as well as their method of production. Under the ISO Standard 1109/78, refractory products are chemically divided into high-alumina products, fireclay refractory, German brick products, silica-refractory, basic products and special products, for example carbon materials, zircon mineral, nitrides, borides, spinels. For further subdivision, one differentiates between refractory building materials that are formed, for example, stones, or unformed products, for instance, mortar, tamping (plastic) refractory, injection materials.

The ISO Standard 2246 describes a differentation according to production methods to which ways of bonding are assigned. At temperatures below 150° C. for example, clay, sodium silicate, cement or organic bonding agents like molasses, lignosulfonate, tar and pitch or synthetic resins can be used as bonding agents. Bonding of products which are heat-processed at 150° to 800° C. can likewise take place inorganic-chemically (phosphate, sulfate), hydraulically (cement) or by organic carbon forming means (for example tar, pitch, synthetic resin).

While previously used as carbon forming bonding agents, for example, to achieve particularly good resistance to slagging, primarily tars or pitches were used as starting materials for good carbon formation. For further quality improvement, and, particularly for environmental considerations, curable synthetic resins, especially furan or phenol resins have been calling attention to themselves as new raw material for possible use.

Especially advantageous in this connection are novolac materials which according to U.S. Pat. No. 4,248,638 or EP-A No. 164,139 are used as solutions in solvents. In spite of the use of solvents with high boiling points, the present drawback is the easy ignitibility at high temperatures as well as the low carbon yield. In JP Application 79.161611 (C.A., Vol. 92,219825 f), a solvent-free modified novolac is recommended but this liquid resin is expensive to produce and its use for that reason is uneconomical.

The production of hot-pressed abrasive disks until now was effected with furfural or other liquid substances as abrasive grain wetting agents, which are only incompletely able to take up the high filling material fraction which is intended to be bound on abrasive grains and therefore yields a molding material mixture which produces a great amount of dust and is unstable. What is now explored is the possibility of producing stable molding material mixtures possessing long storage life as granulates.

Production of friction lining mixtures takes place either in a dry mix process by mixing pulverized bonding agents into a filler material-fiber mixture or through wet processing with the use of aqueous liquid resins or solvent-containing resin solutions with subsequent drying. In many cases, especially when processing asbestos-free lining mixtures, the fiber and filler material wetting and adhesion is inadequate. In addition, in dry mix processes, large problems of dusting and dust production arise.

OBJECTS OF THE INVENTION

It is an object of the invention to provide high-temperature resistance molding materials which contain high-quality, yet cost-effective carbon forming bonding agents and are free of solvents.

This and other objects and advantages of the invention will become obvious from the following detailed description.

THE INVENTION

The improved high temperature resistance molding materials containing customary filler materials and additives and a carbon forming bonding agent have as the bonding agent a phenol novolac with a phenol—formaldehyde molar ratio of 1 to 0.2 to 1 to 0.35.

The usual known molar ratio of phenol to formaldehyde with novolac materials is in the range of 1: (0.75–0.85) (Knop, Pilato: Phenolic Resins, Springer-Verlag 1985, p. 93). In particular, it has been generally thought that only novolac materials with a phenol to formaldehyde ratio of 1 or more than 0.5 was useful as bonding agents, because, on the one hand, low phenol-formaldehyde ratios yield small molecules, the bonding ability of which was considered small and on the other hand, low yields were expected in the production of these bonding agents and therefore uneconomical manufacturing processes of these resins as well as a high residual content of free phenols (comp. Knop, Pilato, FIG. 3, 6 on page 49).

It has been found that phenol-novolacs with a phenol to formaldehyde ratio of 1:0.2 to 1:0.35 can certainly be produced in an economical manner and these novolac materials have a content of free phenol of less than 0.5% and have a surprisingly good bonding ability for filler materials of any kind. The high adhesive holding power of the novolac materials used in the invention is so great that the molding materials produced from it have very good processing properties, for example, high free flowing properties of an abrasive disk granulate or high green performance of the formed refractory products.

It is a further advantageous feature of the bonding agents of the invention that they result in high carbon yield during coking. The high-temperature molding materials of the invention contain the bonding agents and conventional filler and additive materials in the amounts customarily used.

Examples of fillers for refractory products which can be utilized singly or in combination are sand, corundum, bauxite, zirconia, chromites, magnesite, dolomites, borides as well as carbon such as carbon black, coke and graphite.

Filler materials for abrasive disks are corundum and silicium carbides and suitable additive materials are cryolite, pyrites, fluoroborates, zinc sulfide, antimonic anhydride and others.

Examples of fiber material used for friction linings are diabase (greenstone) fiber and fibers of basalt, ceramic, aramide, glass, carbon and metal. Further aggregates are: carbon black, graphite, kaolin, baryta, metal oxides, slate flour, sulfides and metals in the form of powders or shavings.

Bonding agents are either the pure novolac resins with a phenol/formaldehyde ratio of 1:0.2 to 1:0.35 or systems of these resins containing a curing agent, for example, hexamethylenetetramine. It has been found that with the simultaneous use of curing agents, the carbon yield after coking is increased.

Thus, for example, the novolac materials used in refractory materials of the invention yield after coking in the absence of curing agents a carbon yield of 10 to 40% by weight. Analogous refractory products, which contain as bonding agents the novolac materials of the invention and the amounts of curing agents used customarily for this purpose (1 to 20% by weight, preferentially 8 to 15% by weight Hexamine), results after coking in a carbon yield of approximately 50 to 70% by weight.

The refractory products of the invention can be used green for example, as molded, not cured refractory bricks, which on first use with increasing temperatures to maximally 2000° C. harden and carbonize. The can equally well be thermoset by heat processing at 150° to 250° C. especially when bonding agents are used which contain a curing component. Preferably, the thermal treatment of premolded refractory products of the invention is effected at temperature in the range of 800° to 1000° C. The bonding agents are carbonized in the process and what remains is a filled carbon frame and thus an inert dimensionally stable refractory product.

In using the high-temperature resistance molding materials for the production of hot-pressed abrasive disks, the possibility is of advantage that a free flowing dust-free, granulate with long storage life is produced through hot-mixing which may be processed by hot-pressing.

In friction lining production, hot-mixing processes utilizing the high-temperature resistant molding materials of the invention permit combining the advantages of the conventional preparation of the friction lining substance in dry-mixing processes with those of the wet process, i.e. high impregnability of the fiber compounds and the remaining aggregates as well as the absence of solvents and water.

The phenol novolac of the invention is condensed in a manner known per se with a phenol and formaldehyde in a molecular ratio of 1:0.2 to 1:0.35 in an aqueous acidic solution. The phenol used can be mono- or polynuclear or a mixture of the mentioned classes of compounds, and specifically mono- as well as polynuclear phenols. Examples are phenol itself as well as its alkyl-substituted homologs such as o-, m-, or p-cresol or higher alkylated phenols, halogen-substituted phenols like chloro- or bromo-phenol and polyvalent phenols like resorcin or catechol. Polynuclear phenols are preferably naphthols, i.e. compounds with anellated rings.

The phenols are allowed to react with formaldehyde or another substance which under the reaction conditions can split off formaldehyde in an aqueous acidic solution. Products of this nature are, for example, formaldehyde itself, or its usual commercial 30 to 50% aqueous solution (formalin) or substances which contain formaldehyde in chemically loosely bound form like formaldehyde disulfide, urotropin, trioxymethylene or paraformaldehyde.

The novolac materials obtained in this manner are solid at room temperature, begin to melt above 25° C. and have at 70° C. a melting viscosity between 2 to 70 Pa.s (at 60° C. of 8 to 250 Pa.s). This ensures good handling ability, while low mixing temperatures for the production of the high-temperature resistance molding materials of the invention without using solvents are possible. Already at temperatures above 60° C., the filler materials can be mixed with the said bonding agents (resins or resin-curing agent mixtures) and the refractory products of the invention can be produced which then can be molded and used green or after or during the molding thermoset in heat-treatment, possibly are subsequently treated thermally for carbonization or employed as unformed refractories.

In the following examples there are described several preferred embodiments to illustrate the invention. However, it should be understood that the invention is not intended to be limited to the specific embodiments.

EXAMPLE 1

94 kg of phenol were mixed with 940 g of oxalic acid and the mixture was heated to approximately 100° C. While stirring and refluxing, 13.3 kg of 45% formalin were added over three hours and at the end of the addition, the reaction mixture was heated to a free formalin content of $<0.5\%$ with reflux. Then the low boiling components (water and phenol) were removed by distillation and the characteristic properties of the resulting resins and resins of the following examples are shown in Table I.

EXAMPLE 2

Using the procedure of Example 1, 94 kg of phenol and 16.7 kg of formalin (phenol: formaldehyde ratio of 1:0.25) were reacted.

EXAMPLE 3

Using the procedure of Example 1, 94 kg of phenol and 20 kg of formalin (phenol: formaldehyde ratio of 1:0.3) were reacted.

EXAMPLE 4

Using the procedure of Example 1, 94 kg of phenol and 23.3 kg of formalin (phenol: formaldehyde ratio of 1:0.35) were reacted.

TABLE 1

|  | Example 1 | Example 2 | Example 3 | Example 4 |
|---|---|---|---|---|
| Phenol:Formaldehyde ratio (P:F) | 1:0.2 | 1:0.25 | 1:0.30 | 1:0.35 |
| Free Phenol | 0.1% | 0.1% | 0.1% | 0.1% |
| Melting Point | liquid at RT | — | — | — |
| $n_D^{70}$ | 1.6142 | 1.6167 | 1.6181 | 1.6219 |
| Mean Molecular Weight | 250 | 280 | 310 | 350 |
| Melting Viscosity (mPa.s) |  |  |  |  |
| at 50° C. | 57600 | 123000 | 490000 | — |
| at 60° C. | 8600 | 24900 | 79000 | 210000 |
| at 70° C. | 1900 | 4300 | 10800 | 22210 |

EXAMPLES 5 to 8

9500 g of a mixture of magnesite of divergent grain sizes and graphite were heated in a mixing unit to 60° C. and then 500 g of the phenol novolac also pre-heated to 60° C. with the molar ratio of 1:0.2 (Example 1) were homogeneously distributed in the mixture followed by 10% Hexamine relative to the resin. Because of the low mixing temperature, the danger of premature curing in the mixer did not exist. After mixing, the mixture was either directly pressed at 60° C. or allowed to cool to obtain in this way a free flowing material due to the extremely rapid viscosity increase of the resin which can be readily pressed.

After pressing into molded shapes, a cold crashing strength (CCS) of 88 N/mm² resulted. The resin-bonded molded shapes were then heated to a temperature of 180° C. and cured in the process. The products had such a high degree of strength that they could be transported and built into the appropriate unit in the steel works. The cold modulus of rupture (CMOR) of the cured molded shapes was 17 N/mm².

Using the said procedure with different mixing temperatures, the novolac materials of Examples 2 to 4 were processed and the values were determined. The results are contained in Table 2 below.

TABLE 2

| Example | Novolak Molar Ratio P:F | Mixing Temp. | KDF* before Curing | KBF** after Curing |
|---|---|---|---|---|
| 5 | 1:0.2 | 60° C. | 88 N/mm² | 17 N/mm² |
| 6 | 1:0.25 | 65° C. | 88 N/mm² | 18 N/mm² |
| 7 | 1:0.3 | 70° C. | 90 N/mm² | 20 N/mm² |
| 8 | 1:0.35 | 75° C. | 90 N/mm² | 20 N/mm² |

*cold crashing strength (CCS)
**cold modulus of rupture (CMOR)

EXAMPLE 9

9500 g of a mixture of dolomite of different grain size were heated to 80° C. in a mixing unit and then 500 g of the novolac of Example 4 pre-heated to 80° C. with a molar ratio of 1:0.35 was homogeneously distributed in the mixture followed by 10% Hexamine with respect to the resin mixed in. After mixing, the mixture was pressed either directly at 80° C. or was permitted to cool to obtain a free flowing material readily pressable due to the extremely strong viscosity increase of the resin.

After pressing into molded shapes, cold crashing strength of 93 N/mm² was obtained. After curing at 180° C., cold modulus of rupture of 22 N/mm² was determined. Through the utilization of pure novolac as bonding agent for dolomite molded shapes, the hydration sensitivity decreases markedly. The synthetic resin-bonded dolomite brick was stable for approximately 10 days in the summer time.

EXAMPLE 10

600 g of corundum of grain 46 were heated to 140° C. in a high power mixer heated to 140° C. and were wetted intensively with 26.5 g of a 140° C. hot melt of novolac of Example 4 and the mixing process lasted approximately 3 minutes. The mixture was cooled to 90° C. and mixed with a mixture consisting of 45 g of pulverized resin (for example SP 223 from Bakelite), 3.5 g of Hexamine, 9 g of calcium oxide and 37.5 g of cryolite. Then, mixing was continued for another 30 seconds at 90° C. and the resulting abrasive disk mixture was cooled to room temperature.

From the mixture, test specimens with the dimensions 21.4×12.2×140 mm were produced, which were hot-pressed for 3 minutes at 170° C. and cured for 2 hours at 180° C. The flexural strength of the cured test specimens was approximately 93 N/mm².

EXAMPLE 11

1 kg of a novolac of Example 3 was heated to approximately 100° C. and was added to a mixture heated to 100° C. consisting of a 3 kg of steel wool, 1.5 kg of brass shavings, 1 kg of coke, 0.5 kg of graphite, 0.5 kg of polyaramide fibers (2 mm), 1.5 kg of barium sulfate, and 0.7 kg of magnesium oxide as well as 0.2 kg of aluminum oxide. The mixture was mixed intensively in a high-power mixer for approximately 5 minutes and 0.2 kg of 50% aqueous hexamethylenetetramine at 80° C. was added. Mixing was continued for another 3 minutes while the mixture was being cooled and the cooled substance was used for the production of friction linings. The coefficient of friction determined for test specimens which were pressed at 170° C. for 30 seconds per mm of thickness of layer and cured for 10 hours to 200° C. was 0.4

Various modifications of the products of the invention may be made without departing from the spirit or scope thereof and it is to be understood that the invention is intended to be limited only as defined in the appended claims.

What we claim is;

1. In a high-temperature resistance molding material containing customary filler and additive materials and a carbon forming bonding agent, the improvement comprising using as the carbon forming bonding agent a phenol-novolac with a phenolformaldehyde molar ratio of 1:0.2 to 1:035.

2. A high-temperature resistance molding material of claim 1 wherein the bonding agent contains 1 to 20% by weight of a curing agent based on the novolac weight.

3. A high-temperature material material of claim 2 wherein the curing agent is hexamethylene tetramine.

4. A refractory product produced from a molding material of claim 1, wherein the filler material is selected from the group consisting of sand, corundum, bauxite, zirconia, chromites, magnesite, dolomites, borides or wherein the filler material is additional or exclusive selected from the group of coke, carbon black, graphite and pitch.

5. A refractory product produced from a molding material of claim 2, wherein the filler material is selected from the group consisting of sand, corundum, bauxite, zirconia, chromites, magnesite, dolomites, borides or wherein the filler material is additional or exclusively selected from the group of coke, carbon black, graphite and pitch.

6. A refractory product produced from a molding material of claim 4 or 5, which can be used uncured in a green state.

7. A refractory product produced by heat treating a material of claim 4 or 5 at 800° to 1000° C.

8. An abrasive disk produced from a molding material of claim 2 wherein the filler material is selected from the group consisting of corundum carbide and silicum carbide and the additive material is selected from the group consisting of cryolite, pyrite, fluoroborates, zinc sulfide and antimonic anhydride.

9. A friction lining produced from a molding material of claim 2 wherein the filler material is fiber selected from the group consisting of diabase (greenstone) fibers and fibers of basalt, ceramic, aramide, glass, carbon and metal.

* * * * *